Patented Nov. 23, 1948

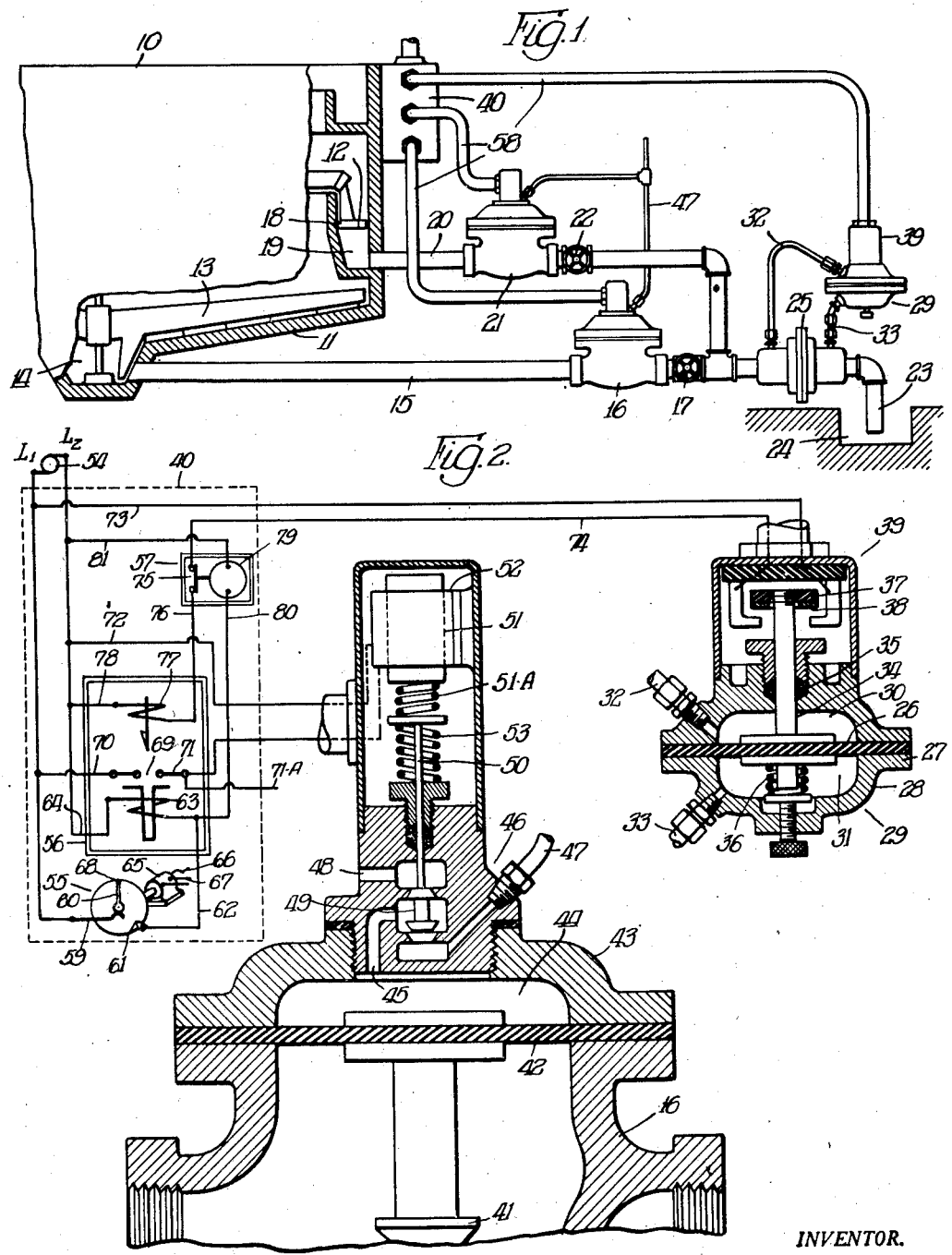

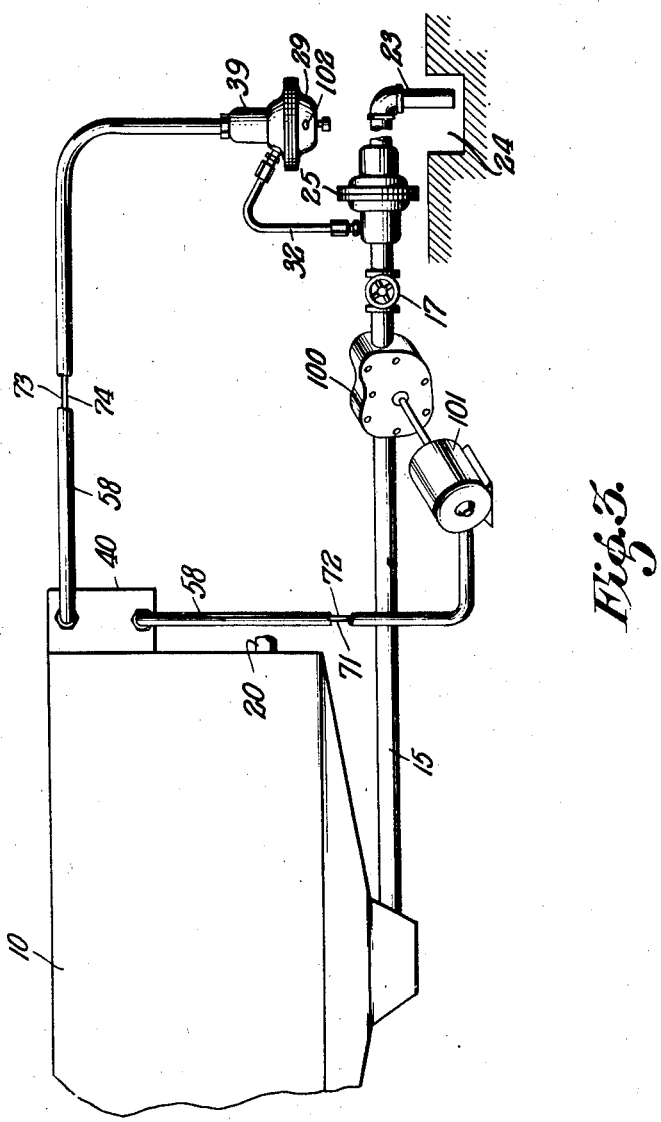

2,454,653

UNITED STATES PATENT OFFICE 2,454,653

METHOD OF AND APPARATUS FOR THE REMOVAL OF SOLIDS FROM LIQUIDS, WITH A CONTROL OPERATING IN RESPONSE TO VISCOSITY OR PRESSURE

Ewald A. Kamp, Chicago, Ill., assignor to Graver Tank & Mfg. Co., Inc., a corporation of Delaware Application November 27, 1944, Serial No. 565,362

4 Claims. (Cl. 210—55)

This invention relates to liquid treatment and particularly to the removal of sludge and other solids from clarification tanks.

It is an object of my invention to provide improved controls for the removal of solid material from a clarification tank.

Another object is to provide such a control which proportions the sludge removal to the amount of sludge settling.

Another object is to provide such a control which insures the withdrawal of the precise type of material to be withdrawn, especially as to concentration of sludge and the like.

Another object is to provide such a control which prevents the removal of excessive or insufficient amounts of material.

Another object is to provide such a control which is automatic, which requires a minimum of readjustments, and which is easily maintained in good working condition.

Another object is to improve the results of clarification by an improved control over the removal of sludge.

Still another object is to provide such a control which is simple, economical, and efficient.

Still other objects will appear from the detailed description which follows.

In the drawing, Fig. 1 is a side elevation, partly in section, of an embodiment of my invention.

Fig. 2 is a diagram of essential control elements used in the apparatus of Fig. 1.

Fig. 3 is a view generally similar to Fig. 1, but showing a modified embodiment.

In the clarification tank 10, sludge solids settle in form of fluid material both upon the lower bottom 11 and elevated bottom or sludge concentrator 12. The sludge settled on the bottom 11 is concentrated, thickened and collected by the sludge scrapers 13, while being scraped into the sludge sump 14. The sump is connected with the outside of the tank by a pipe 15. On this pipe, there is interposed an automatic shut-off valve 16 and also a manual shut-off valve 17, the two valves being in series with one another. Similarly sludge is scraped from the concentrator 12, which may be annular, by scrapers 18, into a sump 19. This sump communicates with the outside of the tank through a pipe 20 having interposed thereon automatic and manual shut-off valves numbered 21 and 22 respectively. Both pipes 15, 20 discharge by gravity through a common outlet pipe 23 leading to a drain or sewer 24.

The common outlet pipe 23 has interposed thereon an orifice 25, or any other means to derive from the gravity flow of sludge a pressure differential or some other function which varies in accordance with the velocity of the flow. This differential or other function is applied to control the automatic valves, as follows.

A differential responsive diaphragm 26 is clamped between the flanges 27 of two shells 28, forming a hydraulic actuator 29 with a high pressure chamber 30 above the diaphragm and a low pressure chamber 31 below the diaphragm. A hydraulic lead 32 connects the pipe 23 on the upstream side of the orifice 25 with the high pressure chamber 30, while a hydraulic lead 33 provides a similar connection between the downstream side and the low pressure chamber. The diaphragm 26 is adapted to reciprocate a rod 34, which extends through the upper pressure chamber 30 and through the upper actuator shell 28, the loss of pressure fluid being prevented by means of a packing gland 35 installed in said upper shell around said rod. A spring 36 is so installed in the lower pressure chamber 31 as to tend to raise the diaphragm 26 and rod 34. The pressure differential set up by the orifice 25 opposes the spring force, and overcomes the same when a certain magnitude of the differential has been reached.

The top of the rod 34, on the outside of the actuator, carries an electrical insulator 37, which in turn carries the pole 38 of an electric switch 39. The combination of the actuator 29 and switch 39 may be designated as a differential pressure switch. This pressure switch is diagrammatically shown as a single pole, single throw, double break switch, of well-known construction.

The automatic valves 16 and 21 are adapted to be opened by an electric starter 40 and to be closed by the pressure switch 29, 39. For this purpose, the valve 16 is self-opening. It comprises a movable valve member 41, associated with an interior diaphragm 42, which diaphragm is continuously exposed to line pressure on the underside, and tends to raise the valve member and thereby to open the valve. A bonnet casting 43 is clamped over the outer flange of the diaphragm 42, whereby a bonnet chamber 44 is formed above the diaphragm. A pneumatic lead 45 connects this bonnet chamber with a three-way pilot valve 46 which is so arranged that the lead 45 and bonnet chamber 44 can be connected to a source 47 of compressed air, or to a vent 48, depending on whether the pilot valve member 49 is raised or lowered respectively. This member 49 is adapted to be raised or lowered by a rod 50, controlled by the armature 51 of a pusher solenoid 52; the solenoid being adapted to push the rod and valve member downward; a compression spring 51—A being interposed between the armature and rod to protect the latter. The solenoid force is opposed by a spring 53, which raises the valve member, rod and armature when the solenoid is de-energized. Accordingly, the source of pressure is connected to the valve bonnet except on energizing the solenoid, and the valve 16, while being self-opening as described, is normally closed in service. This valve 16 is open only when, and so long as, the solenoid 52 is energized.

The internal arrangement of the valve 21 is identical with that of valve 16, and both valves have identical pilots 46 for electric control over the pneumatic pressure adapted to operate the valves. This pneumatic pressure, of course, is greater than the maximum line pressures to be expected in the valves.

A source of electricity 54 provides current for circuits controlling the pilot solenoids of the automatic valves. These circuits are branched off from the usual "line" conductors L—1 (hot wire) and L—2 (ground wire), connected with the source 54. The circuits are associated with the pressure switch 29, 39, and in the starter 40, with a timer unit 55, a latch-in relay 56, and a time-delay relay 57. Of course, the electrical leads between the starter 40, valves 16, 21, and pressure switch 29, 39 are protected by suitable insulators, not shown, in conduits 53.

Hot wire L—1 is in circuit, through a conductor 59, with a movable contactor 60 in the timer unit 55. This unit also contains a fixed but adjustable contactor 61, in circuit with a conductor 62, the latch-in coil 63 of relay 56, conductor 64 and ground wire L—2. The fixed and movable contactors are adapted to be momentarily contacted by a timer mechanism 65 of any desired, known construction, which may be actuated manually by a handle 66, or automatically by conductors 67 controlled from any suitable device (not shown) such as an electric clock, a water flow meter, or a water turbidity meter for the clarifier 10. A predetermined interval elapses between the moment when the movable contactor 60, under automatic control through conductors 67, starts from the zero point 68, and the moment when it reaches the fixed contactor 61. When a time interval is used, this may be selected to cover, for instance, about 5 or 10 or 30 minutes, or sometimes many hours or even days, depending on the type of clarifier 10, the size of pipes 15, 20, and other factors known to the art. The movable contactor 60 is adapted upon momentary contact at point 61 to quickly return towards the zero point 68, to reset itself at that point, and to promptly repeat its travel towards the fixed contactor 61 again, in an indefinite succession of flow timing cycles wherein it moves from 68 to 61 and quick resetting cycles wherein it moves from 61 to 68. This operation is obtained by well-known means (not shown) in the mechanism 65.

Each momentary contact between the fixed and movable contactors 60, 61 results in a momentary starting circuit L—1, 59, 60, 61, 62, 63, 64, L—2, energizing the latch-in coil 63 of relay 56. This coil, when momentarily energized, closes a single pole, single throw, double break, normally open relay switch 69. The usual latch-in mechanism (not shown) keeps this switch closed after de-energization of coil 63. The hot wire L—1 is in circuit with conductor 70, leading to one terminal of switch 69. The other terminal of this switch is in circuit with the conductor 71, pilot pusher solenoid 52 of valve 16, conductor 72, and ground wire L—2. Thus the momentary starting circuit and latch-in mechanism result in a maintained power circuit L—1, 70, 69, 71, 52, 72, L—2, energizing the pilot pusher solenoid 52 of valve 16, lowering the pilot member 49, and opening the valve 16.

The valve 21 is similarly opened by a power circuit including, instead of the conductor 71, a conductor 71—A in parallel therewith, and a suitable ground wire connection (not shown). Both valves 16, 21 are open so long as switch 69 is held closed by the latch-in mechanism.

Hot wire L—1 is in circuit with a conductor 73 leading to one terminal of the pressure switch 29, 39. The other terminal of this switch is in circuit with a conductor 74, time delay switch 75 in relay 57, conductor 76, latch-out coil 77 of relay 56, conductor 78 and ground wire L—2. Thus, assuming that the time delay switch 75 is closed, the closing of the pressure switch 29, 39, results in a valve closing circuit L—1, 73, 39, 74, 75, 76, 77, 78, L—2, energizing the latch-out coil 77. This returns the switch 69 to its normal, open position, breaking the power circuit allowing spring 53 to return pilot 49 to its normal, raised position, and thereby closing valve 16. The other valve 21 is simultaneously and similarly closed.

The time delay switch 75 in relay 57 is controlled by a conventional time delay device 79. Conductor 62 is connected to a conductor 80, in parallel with coil 63; and conductor 80 leads to one terminal of the time delay device 79. Another terminal of this device is in circuit with conductor 81 leading to the ground wire L—2. The device 79 is started by current flowing through the wires 80, 81, and is adapted to run after such a start, and finally to stop itself, after a predetermined time, by conventional means (not shown). While running, this device holds the switch 75 open; this being a single pole, single throw, double break, normally closed switch, interposed between conductors 74 and 76. Momentary contact between the fixed and movable timer contactors 60, 61 results in a momentary, secondary starting circuit L—1, 59, 60, 61, 62, 80, 79, 81, L—2, starting the time delay device 79 and opening the switch 75. This switch is then held open by the running of the time delay device. It is finally returned to its normal, closed position by the stopping of said device, which occurs after a predetermined time delay period, such as one minute, more or less; the selection of this time delay being a matter of choice, depending on the type of clarifier 10, on the size of pipes 15, 20, and on the type and clogging characteristics of the sludge to be expected in the pipe 15. This time delay starts at the moment of the starting contact 60, 61. During this time delay, the pressure switch 29, 39 is inoperative to complete a valve closing circuit.

In operation, either one or both of the manual shut-off valves 17, 22 are open. It will be assumed that valve 17 is open. As liquid is clarified in tank 10, sludge accumulates on bottom 11, and is gradually scraped into the sump 14, filling this sump, as well as the pipe 15 and the upstream side of the valve 16. This tends to raise the diaphragm 42 and to open the valve, but the valve is held closed by the air pressure in bonnet 44; the sludge removal being intermittent, for reasons known to the art. So long as valve 16 is closed in this manner, and no flow passes through the orifice 25, spring 36 holds diaphragm 26 and rod 34 in raised position, and switch 39 is open; in this sense it is a normally open switch.

The operator may, at any time, open the valve 16 by giving the manual starter or timer handle 66 a single, short turn, making contact at 60, 61, whereupon the following occurs. Immediately upon this contact the starting and secondary starting circuits are made; the latch-in relay closes the power circuit; the time delay relay opens the valve closing circuit; and the power circuit lowers the pilot valve member. Thereafter, the power circuit is maintained by the latch-in relay, and the valve closing circuit, normally closed at 75, is held open by the time-delay relay 79, while the timer 55 resets itself. The making of the power circuit, through the pilot valve solenoid, lowers the pilot valve member and allows the valve 16 to open itself; and the valve 16 is held open so long as the pilot is energized. Accordingly, sludge starts and continues to flow by gravity, through this valve, then through the open manual valve 17, pipe 23 and orifice 25 to waste at 24.

The clarifier 10 generally is so constructed and operated that a substantially uniform water level is maintained, regardless whether valve 16 is open or closed. Thus the flow through the valve 16 continues. However, the nature of the material in this flow is subject to change, since the amount of settled, concentrated sludge collected in the sump 14, is gradually exhausted. Thereafter, a considerably thinner material flows to waste 24, consisting of liquid with relatively free sludge particles suspended therein.

Sludge materials of different concentration have different viscosities and therefore different coefficients of friction and different flow velocities under uniform heads. It is known that liquid viscosities, as well as the other values mentioned, or more remote functions thereof, can be measured. However, it is much more difficult to measure the liquid viscosity, or fluid friction coefficient, as such, than to measure functions thereof, especially the relatively remote, hydraulic functions of the viscosity, such as the velocity or pressure of the flow.

In some clarifiers of the lime-soda softener type, the settled, concentrated sludge initially withdrawn may flow at a rate of about one-half, more or less, of the flow velocity exhibited by the water with suspended sludge particles, subsequently received. In a clarifier of the coagulator or flocculator type, using alum or the like, the respective velocities may vary as 1:1.5 in certain cases. In general, a considerable difference prevails between the flow velocities before and after exhaustion of the settled, concentrated sludge collected in the sump.

The fact that concentrated sludge flows so slowly is generally known, and generally considered as a disadvantage. In accordance herewith, a definite advantage is derived from this very fact. Advantage is taken of the fact that it is relatively simple and inexpensive to measure the flow velocity of the sludge, especially to measure it indirectly by measuring a pressure differential in the flow, and thus to measure a relatively remote, hydraulic function of the sludge viscosity.

The flow velocities of the sludge material are indirectly measured by the differential responsive device 29. The differentials, of course, vary as the squares of the velocities. At times of "no flow" through the orifice, the measuring diaphragm is fully raised by the spring. At times of "slow flow," or initial flow of settled, concentrated sludge, the spring pressure is opposed by a differential pressure, but this differential is low. At times of "rapid flow," upon substantial exhaustion of the settled, concentrated sludge, the differential overcomes the spring pressure. Thus the pressure switch 29, 39 is open at "no flow" or "slow flow" but closes and remains closed when a "rapid flow" occurs through the orifice.

The closing of the pressure switch has no effect so long as the time delay switch remains open. This time delay is provided to insure a certain minimum withdrawal of sludge upon each contact 60, 61, and also to eliminate any premature energization of the latch-out coil by pressure surges which may occur in the sludge orifice, causing vibrations of the pressure switch, upon the opening of the valve 16, especially due to sludge which may have partly clogged the pipe 15. Ordinarily, the time delay can be selected to be quite short as compared with the average period of flow of settled sludge.

The latter period is variable, depending on the amount of water flowing through the clarifier, the degree of hardness, turbidity or the like to be removed, the type and proportion of chemicals used for this purpose, the amount of precipitates, if any, which fail to settle, and other variables. It is in view of these variables, which are not easily subjected to any other close control, that I provide the combination of the starter with the automatic pressure switch control, or equivalent, as herein described and claimed.

After the predetermined time delay or minimum valve opening period has elapsed, but generally not immediately thereafter, the valve 16 is closed. This is effected by the pressure switch, as described, and will generally happen a few minutes after the end of the time delay period. However, in some cases the flow of settled sludge may continue, and the valve 16 may remain open, for much longer periods. In still other, exceptional cases, the settled sludge may be exhausted during the time delay period, or there may be no settled sludge at all, and the valve 16 closes immediately after the time delay period.

While the starting operation specifically described above was manual, this, of course, can be effected automatically, through the conductors 67. Regardless whether the sludge withdrawal is started manually, or in a definite time cycle, or the like, the sludge withdrawal is always terminated in automatic response to the exhaustion of the concentrated sludge to be withdrawn, and the arrival of somewhat thinner sludge, prior to the withdrawal of any real thin sludge or supernatant.

The automatic starting generally can be much more frequent than the manual starting, at equal cost. A timer device 55 can be selected for cycles adjustable between five and thirty minutes, for instance, as well as for the eight-hour or twelve-hour cycles which are usual for manual operations. A more frequent manual operation is expensive, but a more frequent timer operation is not.

Again, a longer sludge flow period makes a manual control over the closing of the sludge valve more costly, while it adds nothing to the cost of an automatic control.

Thus a fully manual system of control for sludge withdrawal periods, to be economical, tends to use sparse but short withdrawal cycles, requiring large sludge sumps, pipes and valves; but automatically started and terminated periods are free from such limitations. Thus I can withdraw sludge from a clarifier in cycles to suit a subsequent sludge digestor or the like, and make any clarifier plant particularly flexible and adaptable; and in accordance herewith, this desirable result is attained without any danger of accidental errors due to automatic withdrawals of excessive or insufficient amounts of sludge, during each of the withdrawal cycles.

An important advantage in the automatic terminating of the sludge withdrawal, in response to the flow velocity of the sludge material, lies in the simplicity and reliability of the devices used. Flow velocity or differential pressure are characteristic features which are measured or responded to without the need for relatively costly structures or operations. I do not wish to say that sludge flow velocity is measured, or responded to, without any difficulties. It may be necessary, in some cases, to install conventional blow-back or clean-out devices (not shown), and various other aids; all of these, however, are relatively cheap, simple, easy to operate and readily maintained in good condition.

A further important advantage of this automatic terminating control is that it tends to improve the operation of the clarifier 10. All other control means for sludge withdrawal, not responsive to the density, viscosity, flow velocity or pressure of the sludge as withdrawn, are conducive to occasional withdrawals of either excessive or insufficient amounts of sludge, until such errors are discovered and manually corrected. Insufficient withdrawals, of course, will foul a clarifier quickly. Excessive withdrawals are wasteful, since they put an unnecessary load on the sludge dewatering devices which usually follow; and in clarifiers using sludge filtration, excessive withdrawals are likely to lead to poor operation, or complete breakdown. Variable sludge withdrawals, sometimes removing thin and sometimes concentrated sludge, may necessitate the use of auxiliary thickeners. All these disadvantages and complications are eliminated by the automatic terminating control as proposed.

Instead of the gravity flow of sludge as shown, a pressure flow under pump control is sometimes provided, mainly in connection with clarifiers discharging sludge into remote or elevated digestors or the like. In this event the flow can be controlled by the pump, instead of the valves 16, 21. The pumps used are sometimes of the constant discharge type, minimizing or eliminating the velocity changes mentioned. This, however, does not mean that the principles hereof cannot be applied. A relatively remote, measurable function of the lower viscosity of the thinner sludge material, on exhaustion of the settled, concentrated sludge, can be measured again, and the pump controlled in accordance with the measurement.

An embodiment of the last mentioned type is shown in Fig. 3. Here the flow of sludge from the clarifier 10, through pipe 15, is controlled by the pump 100 driven by motor 101. The sludge propelled and discharged by the pump flows through the orifice 25 and then through a relatively long pipe 23 before it reaches the remote point 24 of final disposal. The discharge pressure upstream of the orifice, is transmitted by the hydraulic lead 32 to the high pressure chamber of the hydraulic actuator 29. This actuator is identical with that of Fig. 2, except that it has instead of a low pressure connection 33, a vent 102 to the atmosphere, in communication with the low pressure chamber. The actuator carries the same pressure switch 39, as in Fig. 2. The electric conductors 71 and 72 lead from the timer 40 to the pump motor 101.

In the operation of the embodiment of Fig. 3, the pump motor 101 is normally deenergized, and the pump 100 stops the outflow of any viscous sludge from clarifier 10 to the remote point 24. The timer 40 operates as previously described. After a predetermined, more or less arbitrary time interval, this timer causes electric current to flow through the conductors 71, 72, energizing the pump motor 101 and thereby starting the pump, which then is kept running by the latch-in relay in timer 40. In the beginning of the sludge flow, there may be some fluctuations in the pump discharge pressure; these are transmitted into the actuator 29, and switch 39, but prevented from disturbing the timer 40 by the time-delay relay 75, as previously described. Aside from such initial pressure fluctuations, there is a tendency for gradually increasing discharge pressures. A heavy, viscous sludge initially arrives in said flow, which constitutes an appreciable load for the pump 100, so that the discharge pressure in the actuator is relatively low; however this type of sludge is gradually exhausted from the tank, and when a lighter and less viscous sludge arrives, the load on the pump is reduced, and the discharge pressure accordingly is increased. As a result, the actuator diaphragm is lowered, the pressure switch closed, and the latchout circuit completed through the time delay relay which in the meantime has closed. Thus the pump motor is deenergized, and the sludge flow terminated, before any appreciable amount of light and dilute sludge is pumped out of the tank.

The pressure responsive device, of course, is not necessarily an orifice and differential actuator. The clarifier and piping may be vastly different. Various other modifications can be applied.

I claim:

1. Method of removing solid particles from a liquid, comprising the steps of continuously collecting in a lower portion of a tank a viscous but fluid sludge containing the solid particles to be removed; establishing a flow of the sludge from said portion of the tank; measuring the viscosity of the sludge in said flow; and applying a control tending to terminate said flow in response to a predetermined reduction of the viscosity measured, whereby the amount of sludge removed from the tank by such flow is substantially proportional to the amount of sludge collected in the tank, regardless of variations in the quantity and character of liquid treated and in the quantity and character of solid particles in such liquid.

2. Method of removing solid particles from a liquid, comprising the steps of continuously collecting in a portion of a tank a viscous but fluid material containing the solid particles to be removed; establishing intermittent flows of such material from said portion of the tank; measuring a pressure of each of said flows; and terminating each of said flows upon a predetermined increase of said pressure, whereby the amount of solid particles removed from the tank by such intermittent flows is substantially proportional to the amount of solid particles collected in the tank.

3. Method of removing solid particles from a liquid, comprising the steps of settling a sludge containing such particles; removing flows of settled sludge from the liquid; measuring a differential pressure of such flows; and terminating such flows upon a predetermined increase of said differential pressure.

4. Sludge removal means for a liquid clarification tank, comprising a sludge outlet conduit for said tank; means to establish intermittent flows of sludge through said conduit; means associated with said conduit to measure a pressure of each of said flows; and means adapted upon a predetermined increase of the pressure as measured to terminate each of said flows.

EWALD A. KAMP.

REFERENCES CITED

The following references are of record in the file of this patent:

UNITED STATES PATENTS

| Number | Name | Date |
|---|---|---|
| 1,514,839 | Edwards et al. | Nov. 11, 1924 |
| 2,041,862 | Rhodes | May 26, 1936 |
| 2,355,561 | Robinson | Aug. 8, 1944 |